(12) United States Patent
Scheps

(10) Patent No.: US 7,817,697 B1
(45) Date of Patent: Oct. 19, 2010

(54) LASER DIODE PUMPED SOLID-STATE DYE LASER AND METHOD FOR OPERATING SAME

(75) Inventor: Richard Scheps, Rancho Santa Fe, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1265 days.

(21) Appl. No.: 10/631,219

(22) Filed: Jul. 28, 2003

(51) Int. Cl.
*H01S 3/20* (2006.01)
(52) U.S. Cl. .......................... 372/53; 372/75
(58) Field of Classification Search .................... 372/53
See application file for complete search history.

(56) References Cited

U.S. PATENT DOCUMENTS

| | | | |
|---|---|---|---|
| 5,307,358 A | * | 4/1994 | Scheps .................. 372/20 |
| 5,530,711 A | * | 6/1996 | Scheps .................. 372/20 |
| 5,982,789 A | * | 11/1999 | Marshall et al. ............ 372/22 |
| 6,539,041 B1 | | 3/2003 | Scheps |
| 2002/0071645 A1 | * | 6/2002 | Hogan .................. 385/122 |

OTHER PUBLICATIONS

Merriam-Webster's Collegiate Dictionary, 10th Edition, p. 1073, "several".*

* cited by examiner

*Primary Examiner*—Tod T Van Roy
(74) *Attorney, Agent, or Firm*—Kyle Eppele; J. Eric Anderson

(57) ABSTRACT

A method for generating a laser output signal includes the steps of: generating an optical pump signal that is a sequence optical pulses each having a duration of about $n\tau_f$, where $\tau_f$ represents a flourescence lifetime of a laser dye and $3 \leq n \leq 25$; directing the optical pump signal into an optical resonant cavity having a laser dye gain element that contains the laser dye for transforming the optical pump signal into an excited optical signal; resonating the excited optical signal in the optical resonant cavity; and emitting a portion of the excited optical signal from the optical resonant cavity.

12 Claims, 4 Drawing Sheets

LASER DIODE PUMPED SOLID-STATE DYE LASER AND METHOD FOR OPERATING SAME

BACKGROUND OF THE INVENTION

Dye lasers, and particularly organic dye lasers, have certain, unique features. Depending on the specific dye in the laser, the output wavelength is tunable over a bandwidth of approximately 100 nanometers. Dye lasers can operate from the ultraviolet to the infrared, and a single laser resonator cavity can be used to cover this entire wavelength range simply by changing dyes and coatings on the intra-cavity optical components.

Threshold pump power for solid-state dye lasers vary depending on the gain material, and the laser cavity design, but are typically several kilowatts. As laser diodes tend to be multi-watt devices, the concept of direct diode pumping of solid-state dye lasers is remote, requiring literally thousands of laser diodes. It would therefore be desirable a system and/or method by which fewer laser diodes would be able to achieve dye laser threshold.

SUMMARY OF THE INVENTION

The inventive concept may be implemented as a laser that includes: a first optically reflective element; a second optically reflective element opposed to and aligned with the first optically reflective element to define a laser cavity having an optical axis; a laser dye gain element having a laser dye and which is interposed between the first and second optically reflective elements along the optical axis for transforming an optical pump signal into a resonant optical signal; a laser diode system for generating and injecting the optical pump signal into the laser cavity along the optical axis, where the optical pump signal is a sequence of optical pulses having a duration of about $n\tau_f$, where $\tau_f$ represents a flourescence lifetime of the laser dye, and $3 \leq n \leq 25$.

The inventive concept may also be implemented as a method for generating a laser output signal and includes the steps of: generating an optical pump signal that is a sequence optical pulses each having a duration of about $n\tau_f$, where $\tau_f$ represents a flourescence lifetime of a laser dye and $3 \leq n \leq 25$; directing the optical pump signal into an optical resonant cavity having a laser dye gain element that contains the laser dye for transforming the optical pump signal into an excited optical signal; resonating the excited optical signal in the optical resonant cavity; and emitting a portion of the excited optical signal from the optical resonant cavity.

BRIEF DESCRIPTION OF THE DRAWINGS

Throughout the several views, like elements are referenced using like references.

DESCRIPTION OF THE PREFERRED EMBODIMENT

Figure 1:
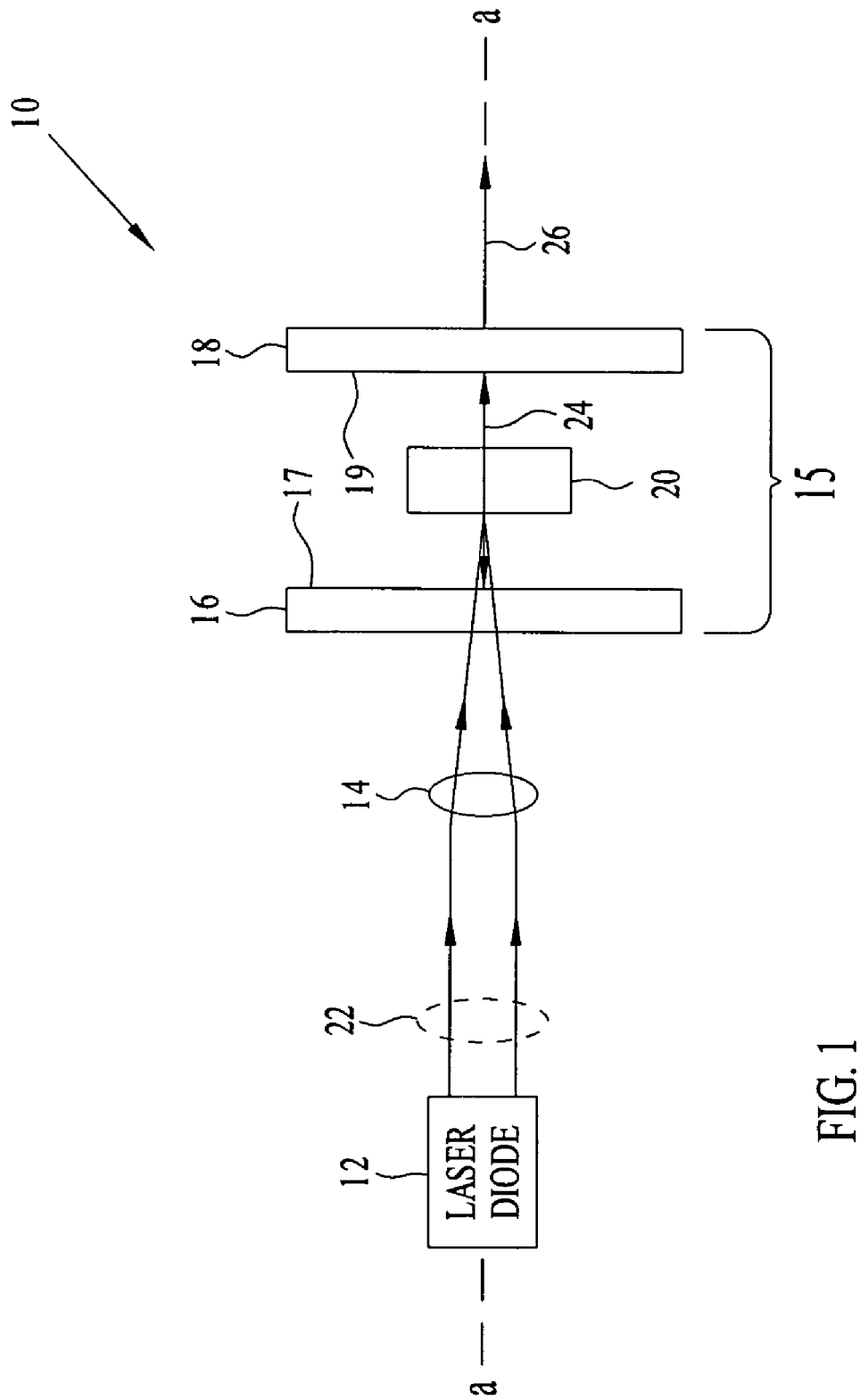
FIG. 1 shows an embodiment of a solid-state laser that is pumped by a laser diode.

Referring to FIG. 1, there is shown a laser 10 that includes a laser diode 12, focusing lens 14, first optically reflective element 16, second optically reflective element 18, and dye gain element 20. The first and second optically reflective elements 16 and 18 are opposed and aligned so as to define an optical resonant, or "laser" cavity 15 having an optical axis a-a. Laser diode 12 generates an optical pump signal 22, characterized by a wavelength $\lambda_1$. The optical pump signal 22 includes a sequence of optical pulses 23 (FIG. 2), where the pulses may have a periodicity P, and a pulse width or duration as described below. Optical pump signal 22 is focused by lens 14 and directed through first optically reflective element 16 and dye gain element 20. Lens 14 is selected so as to be made of a material that is highly transparent to optical energy having a center wavelength of $\lambda_1$. For example, fused silica is highly transparent to optical energy having a wavelength 650 nanometers (nm). Dye gain element 20 absorbs pump signal 22 and produces an excited optical signal 24 that resonates along optical axis a-a between the reflective surfaces 17 and 19 of reflective elements 16 and 18, respectively. In another embodiment, either or both of reflective surfaces 17 and 19 may be flat or curved. By way of example, dye gain element 20 may be implemented so as to include a solid-state host material in which a dye is dissolved. Such solid-state host materials may be selected from the group that includes plastic, porous glass and sol-gels. Although only one laser diode 12 is depicted in FIG. 1, it is to be understood that laser 10 may be implemented using any appropriate number of laser diodes 12 which may be configured into an array or otherwise as required to suit the needs of a particular application.

Excited optical signal 24 is characterized by a wavelength $\lambda_2$ that is highly reflected by reflective surface 17 of optically reflective element 16, but only partially reflected by reflective surface 19 of optically reflective element 18. Thus, excited optical signal 24 resonates between optically reflective elements 16 and 18, and gains energy so as to be "amplified" each time excited optical signal 24 passes through dye gain element 20. Excited optical signal 24 may, therefore, be referenced as a "resonant" optical signal. Because surface 19 of optically reflective element 18 is only partially reflective of optical energy having a center wavelength of about $\lambda_2$, a laser output signal 26, which is a fraction, or portion of excited optical signal 24, is emitted out of the optical resonant cavity 15 through optically reflective element 18 along optical axis a-a.

Still referring to FIG. 1, in one embodiment, dye gain element 20 may be made of a solid-state plastic host material such as modified polymethyl methacrylate (MPMMA) in which a laser dye is dissolved. Examples of laser dyes suitable for use in conjunction with gain element 18 include rhodamine 700, oxazine 750, DOTCI, and oxazine 725. In one embodiment, the laser dye concentration in gain element 20 may be established so that the gain element 20 absorbs about 85% of the energy of optical pump signal 22.

Figure 2:
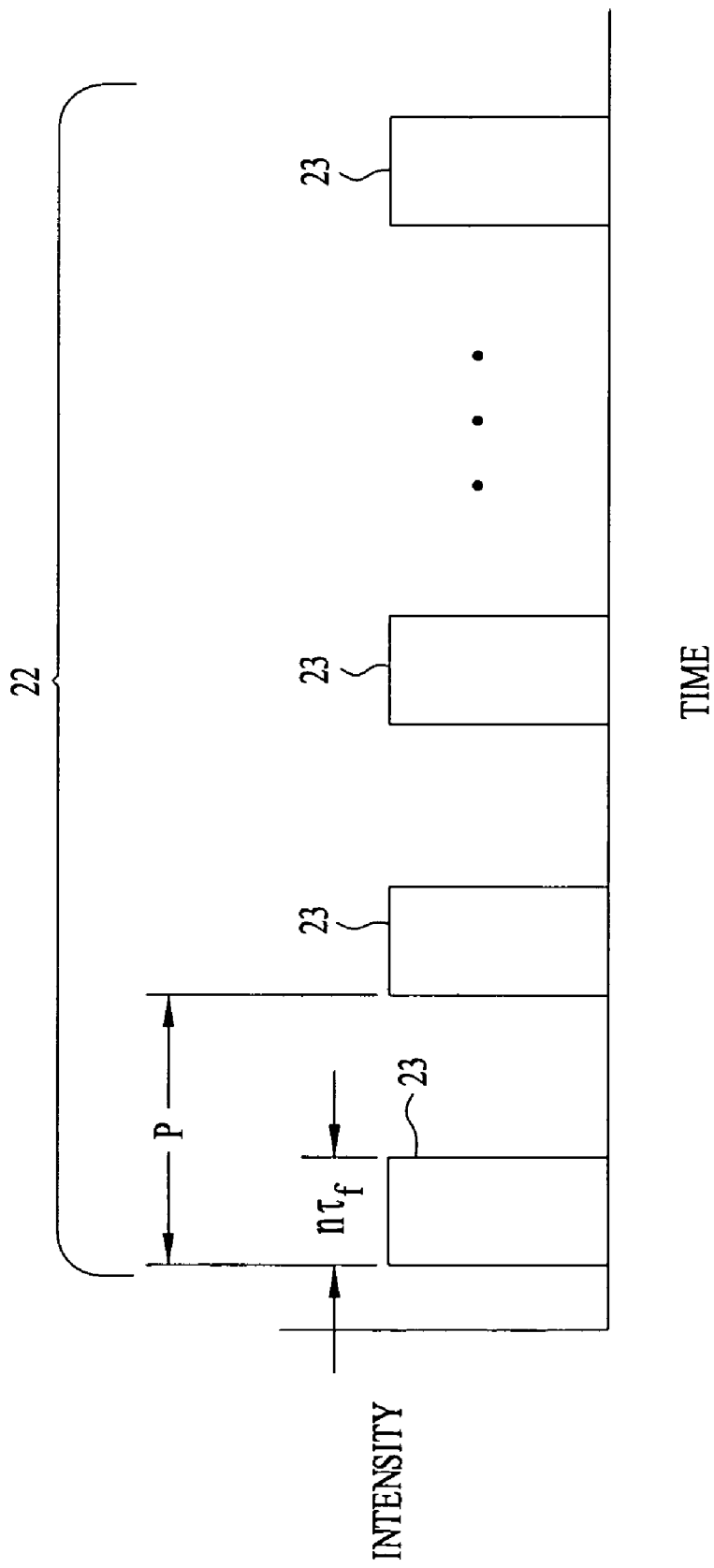
FIG. 2 shows the waveform of an optical pulse that may be used to pump the solid-state laser of FIG. 1.

Referring to FIG. 2, optical pump signal 22 may include a series or sequence of pump pulses 23 having a periodicity P. Each pulse 23 has a pulse duration or width of about $n\tau_f$, wherein $\tau_f$ represents a fluorescence lifetime, or fluorescent time constant, of the laser dye in dye gain element 20, and $3 \leq n \leq 25$. Typical fluorescence lifetimes for laser dyes are about 4 nanoseconds. By way of example, P may be in the range of about 1 KHz to 1 MHz.

Figure 3:
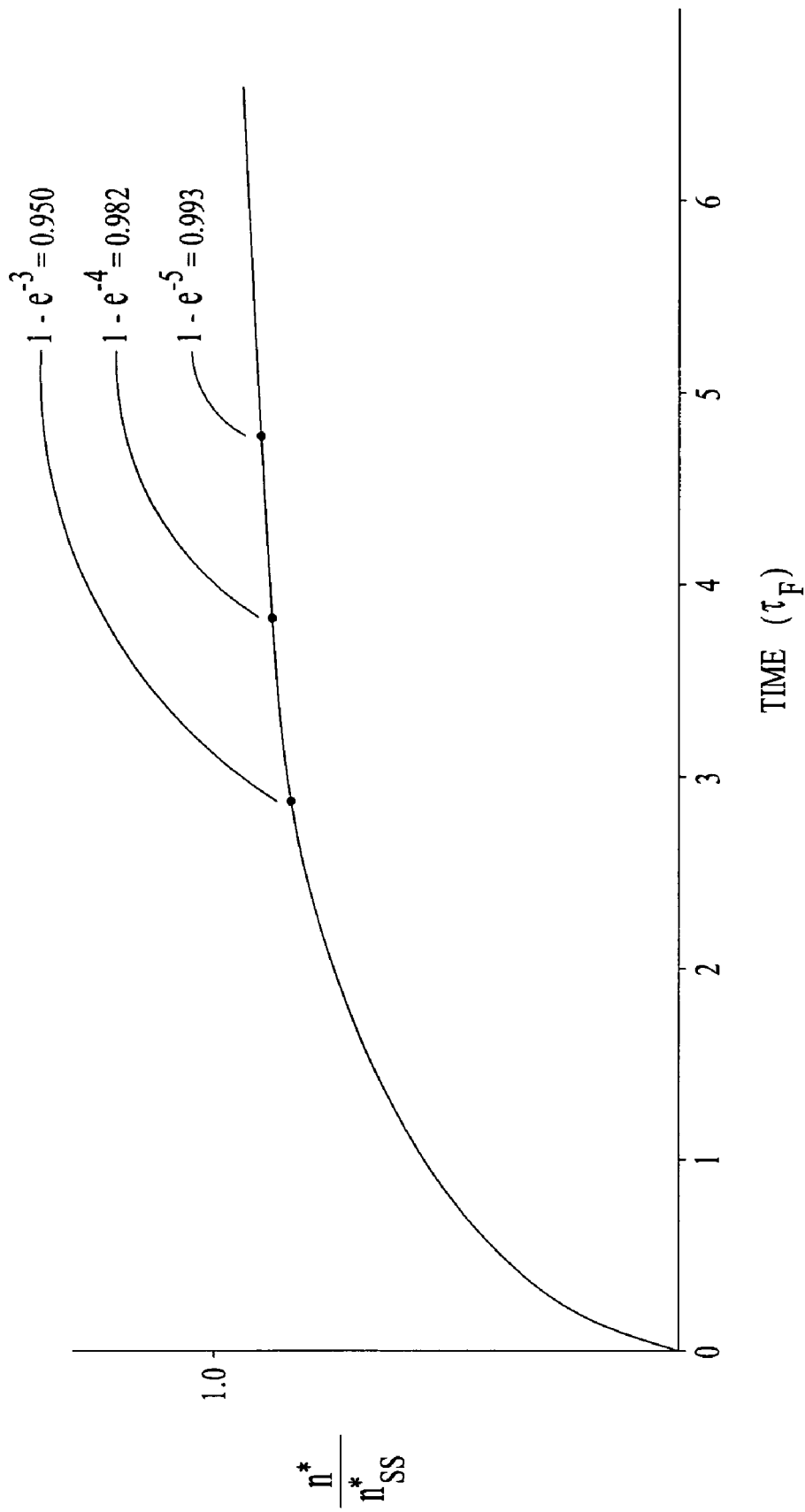
FIG. 3 shows a plot of the ratio of the concentration of excited state dye molecules produced after time t after the onset of an optical pump pulse to the steady state concentration of excited state dye molecules

FIG. 3 is a graph of the equation:

$$\frac{n^*}{n_{ss}^*} = 1 - e^{-t/\tau_f},$$

where n* represents the concentration of excited state dye molecules of a laser dye, and $n_{ss}^*$ represents the concentration of excited state dye molecules that would exist if the optical pump pulse were infinitely long, and t represents the time during the pump pulse. In the case where $t=3\tau_f$ then $$\frac{n^*}{n_{ss}^*} = 1 - e^{-3} = 0.950.$$

In the case where $$t = 4\tau_f, \text{ then } \frac{n^*}{n_{ss}^*} = 1 - e^{-4} = 0.982,$$

and in the case where $$t = 5\tau_f, \text{ then } \frac{n^*}{n_{ss}^*} = 1 - e^{-5} = 0.993.$$

Thus, it may be appreciated that in applications wherein optical pump signal 22 has a pulse duration in the range of $3\tau_f$ to $25\tau_f$, then the concentration of dye molecules in the excited state is close to that of the steady-state value. Hereinafter each pulse 23 of optical pump signal 22 having a duration in the range of $3\tau_f$ to $25\tau_f$ is referenced herein as a "short optical pulse."

Laser diodes operate in a "quasi-continuous" wave mode after the first 50-100 ns after being turned on. But in the non-steady-state mode, for the first few tens of nanoseconds, a laser diode emits approximately 50 to 100 times the "quasi-continuous" wave power. Therefore, a 1 watt diode can produce 50 to 100 watts of short pulse power. Since fluorescence lifetimes of a laser dye are typically a few nanoseconds, for example 3-6 ns, an efficient directly diode pumped pulsed solid-state dye laser can be produced by short pulse laser dye excitation wherein each optical pulse is a "short optical pulse," as defined above.

When dye gain element 20 is pumped by a sequence of short optical or excitation pulses 23, the laser 10 may exceed the threshold for lasing. In contrast, operating the laser diodes 12 in a "quasi-continuous" wave mode may not produce enough power to exceed the lasing threshold of optical resonant cavity 15. Therefore, by operating laser diodes 12 with a short pulsed optical pump signal, only 10-20 laser diodes 12 may be needed to exceed the lasing threshold for optical resonant cavity 15, rather than needing thousands of one watt laser diodes operating in a quasi-continuous mode.

Figure 4:
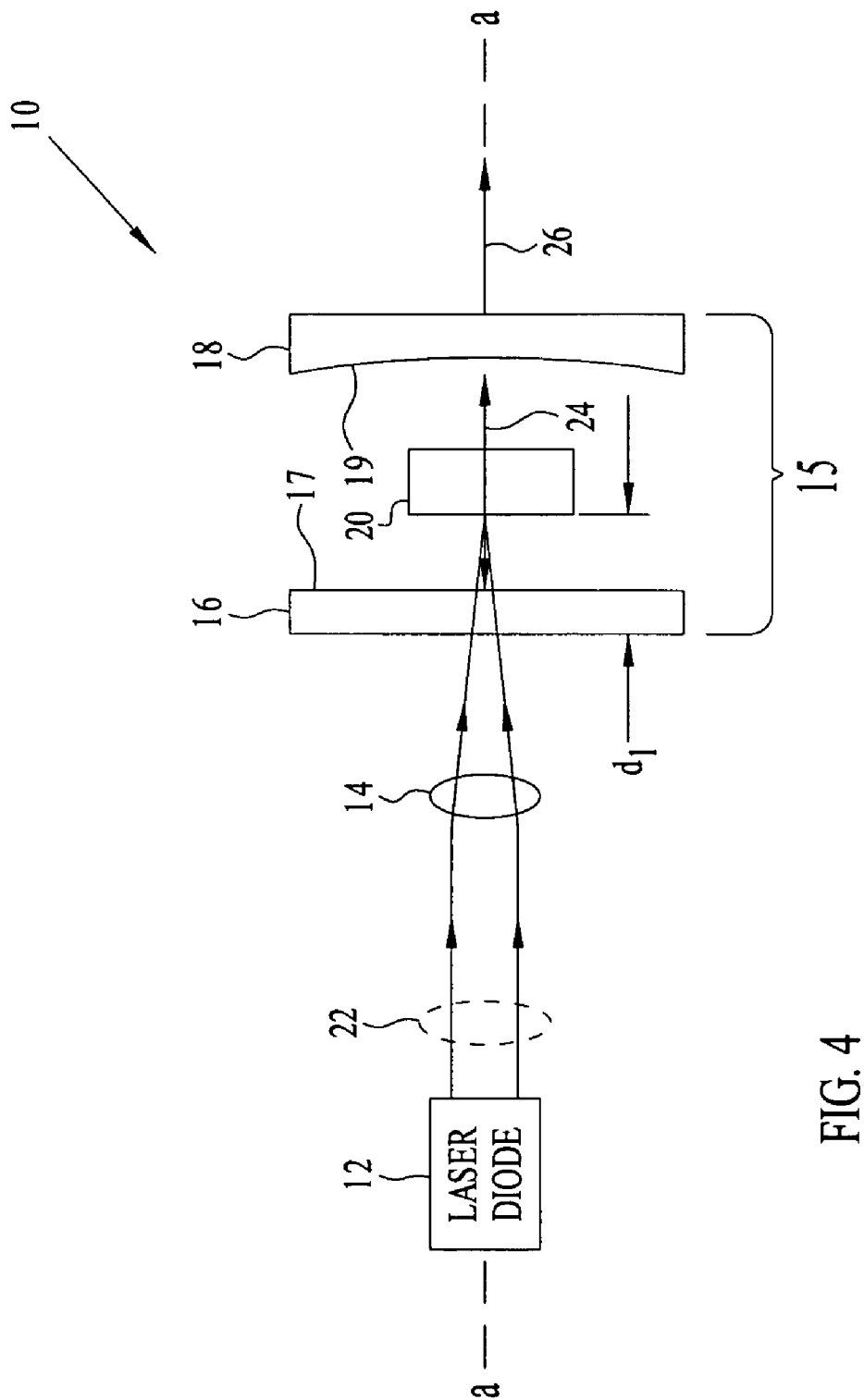
FIG. 4 shows an embodiment of a nearly hemispherical optical resonant cavity.

In FIG. 4, there is shown another embodiment of optical resonant cavity 15 wherein second optically reflective element 18 has a partially reflective surface 19 as described above, where concave surface 19 has a radius of curvature, r.

Dye gain element 20 is positioned within a distance $d_1$ of the reflecting surface 17 of first optically reflective element 16, where $d_1$ is minimized as far as is practical, as for example, where $d_1 \leq 200\mu$. Moreover, the distance $d_2$ between the center of curvature of reflective surface 19 and the reflective surface 17 of first optically reflective element 16 is within a few millimeters less than the radius of curvature r so that optical resonant cavity 15 provides a nearly hemispherical resonator.

Obviously, many modifications and variations of the laser diode pumped solid-state laser described herein are possible in light of the above teachings. It is therefore to be understood that within the scope of the appended claims, the invention may be practiced otherwise than as specifically described.

I claim:

1. A laser, comprising:
   a first optically reflective element;
   a second optically reflective element opposed to and aligned with said first optically reflective element to define a laser cavity having an optical axis;
   a laser dye gain element having a laser dye and which is interposed between said first and second optically reflective elements along said optical axis for transforming an optical pump signal into a resonant optical signal;
   a laser diode system for generating and injecting said optical pump signal into said laser cavity along said optical axis, where said optical pump signal is a sequence of optical pulses having a pulse width of about $n\tau_f$, where $\tau_f$ represents a fluorescence lifetime of said laser dye, and $3 \leq n \leq 25$ so that said laser diode system operates only in a non-steady-state mode.

2. The laser of claim 1 wherein said optical pump signal has a pulse period in the range of about 1 Khz to 1 Mhz.

3. The laser of claim 1 wherein said laser dye gain element includes a host material selected from the group that includes porous glass, plastic, and sol-gels.

4. The laser of claim 3 wherein said plastic consists essentially of modified polymethyl methacrylate.

5. The laser of claim 1 wherein said first optically reflective element has a curved reflective surface.

6. The laser of claim 5 wherein said first and second optically reflective elements define a nearly hemispherical resonator.

7. A method for generating a laser output signal, comprising the steps of:
   operating a diode laser system only in non-steady-state mode by generating an optical pump signal that is a sequence of optical pulses each having a pulse width of about $n\tau_f$, where $\tau_f$ represents a fluorescence lifetime of a laser dye and $3 \leq n \leq 25$;
   directing said optical pump signal into an optical resonant cavity having a laser dye gain element that contains said laser dye for transforming said optical pump signal into an excited optical signal;
   resonating said excited optical signal in said optical resonant cavity; and
   emitting a portion of said excited optical signal from said optical resonant cavity.

8. The method of claim 7 wherein said optical pump signal has a pulse period in the range of about 1 Khz to 1 Mhz.

9. The method of claim 7 wherein said laser dye gain element includes a host material selected from the group that includes porous glass, plastic, and sol-gels.

10. The method of claim 9 wherein said plastic consists essentially of modified polymethyl methacrylate.

11. The method of claim 7 wherein said optical resonant cavity is a nearly hemispherical resonator.

12. A method for generating a laser output signal, comprising the steps of:
- operating a laser diode system only in a non-steady-state mode by generating an optical pump signal that is a sequence of optical pulses each having a pulse width t, wherein $0.950 \leq 1-e^{-t/\tau_f} \leq 0.993$, and $\tau_f$ represents a fluorescence lifetime of a laser dye;
- directing said optical pump signal into an optical resonant cavity having a laser dye gain element which contains said laser dye that is characterized by said fluorescent lifetime, $\tau_f$, for transforming said optical pump signal into an excited optical signal;
- resonating said excited optical signal in said optical resonant cavity; and
- emitting a portion of said excited optical signal from said optical resonant cavity.

* * * * *